United States Patent
Takada

(10) Patent No.: US 10,673,330 B2
(45) Date of Patent: Jun. 2, 2020

(54) SWITCHING REGULATOR WITH A FREQUENCY CHARACTERISTICS SEPARATION CIRCUIT AND A PHASE COMPENSATION CIRCUIT

(71) Applicant: ABLIC Inc., Chiba-shi, Chiba (JP)

(72) Inventor: Kosuke Takada, Chiba (JP)

(73) Assignee: ABLIC INC., Chiba (JP)

(*) Notice: Subject to any disclaimer, the term of this patent is extended or adjusted under 35 U.S.C. 154(b) by 0 days.

(21) Appl. No.: 16/198,033

(22) Filed: Nov. 21, 2018

(65) Prior Publication Data

US 2019/0165667 A1  May 30, 2019

(30) Foreign Application Priority Data

Nov. 28, 2017 (JP) ................. 2017-228061

(51) Int. Cl.
| | |
|---|---|
| *H02M 3/156* | (2006.01) |
| *H02M 3/158* | (2006.01) |
| *H02M 1/14* | (2006.01) |
| *H02M 1/00* | (2006.01) |

(52) U.S. Cl.
CPC ............ *H02M 3/156* (2013.01); *H02M 1/14* (2013.01); *H02M 3/1588* (2013.01); *H02M 2001/0025* (2013.01); *H02M 2001/0035* (2013.01)

(58) Field of Classification Search
CPC ........... H02M 1/14; H02M 2001/0003; H02M 3/156; H02M 3/157; H02M 3/158; H02M 3/1588
See application file for complete search history.

(56) References Cited

U.S. PATENT DOCUMENTS

2007/0247131 A1  10/2007  Sohma
2009/0302820 A1* 12/2009  Shimizu ................ H02M 3/156
                                                        323/285

(Continued)

FOREIGN PATENT DOCUMENTS

| JP | 2007-259599 A | 10/2007 |
| JP | 2010-68671 A | 3/2010 |

OTHER PUBLICATIONS

Williams, Ian; "CRC Filter Supply"; 2016; Paladin; pp. 1-5 (Year: 2016).*

*Primary Examiner* — Yusef A Ahmed
*Assistant Examiner* — Shahzeb K Ahmad
(74) *Attorney, Agent, or Firm* — Brinks Gilson & Lione

(57) ABSTRACT

Provided is an switching regulator including: an error amplification circuit configured to output a first error voltage based on an output voltage and a first reference voltage; a PFM comparison circuit configured to compare the first error voltage with a second reference voltage to output a comparison result signal; an oscillation circuit configured to output a clock signal, and to stop output of the clock signal depending on the comparison result signal; a frequency characteristics separation circuit to which the first error voltage is provided, and from which a second error voltage is supplied; a phase compensation circuit connected to the frequency characteristics separation circuit; and a PWM conversion circuit configured to turn the switching element on and off at a desired pulse width, based on the second error voltage and on the output from the oscillation circuit.

5 Claims, 6 Drawing Sheets

(56) References Cited

U.S. PATENT DOCUMENTS

2009/0322303 A1* 12/2009 Hirata .................. H02M 3/156
  323/284
2010/0066328 A1   3/2010 Shimizu et al.
2012/0139507 A1*  6/2012 Ferguson ............. H02M 3/158
  323/234
2012/0274300 A1* 11/2012 Nakashima ............ H02M 1/14
  323/284

* cited by examiner

SWITCHING REGULATOR WITH A FREQUENCY CHARACTERISTICS SEPARATION CIRCUIT AND A PHASE COMPENSATION CIRCUIT

RELATED APPLICATIONS

This application claims priority under 35 U.S.C. § 119 to Japanese Patent Application No. 2017-228061 filed on Nov. 28, 2017, the entire content of which is hereby incorporated by reference.

BACKGROUND OF THE INVENTION

1. Field of the Invention

The present invention relates to a switching regulator.

2. Description of the Related Art

A circuit diagram of a switching regulator 800 of the related art is illustrated in FIG. 8.

The switching regulator 800 of the related art includes: a power supply terminal 801; a ground terminal 802; a reference voltage source 810; an error amplification circuit 811; a reference voltage source 812; a PFM comparison circuit 813; an oscillation circuit 814; a PMOS transistor 830; an NMOS transistor 831; an inductor 840; a capacitor 841; resistors 843 and 844; an output terminal 842; a PWM conversion circuit 850 which includes a current-voltage conversion circuit 820, a slope voltage generation circuit 821, a PWM comparison circuit 822, a control circuit 823, and a reverse flow detection circuit 824; and a phase compensation circuit 860 which includes a capacitor 861 and a resistor 862. The switching regulator 800 is configured by connecting the components in the manner illustrated in FIG. 8 (for example, see Japanese Patent Application Laid-open No. 2010-68671).

The error amplification circuit 811 compares a voltage VFB which is brought by dividing an output voltage VOUT of the output terminal 842 between the resistor 843 and the resistor 844 with a reference voltage VREF1 of the reference voltage source 810, and outputs an error voltage VERR.

The current-voltage conversion circuit 820 converts a source current of the PMOS transistor 830 into a voltage, and outputs the voltage to the slope voltage generation circuit 821. The slope voltage generation circuit 821 adds a saw-tooth wave to the output from the current-voltage conversion circuit 820, and outputs a voltage VCS. The PWM comparison circuit 822 compares the error voltage VERR and the voltage VCS, and outputs a comparison result signal CMPW to the control circuit 823.

The PFM comparison circuit 813 compares the error voltage VERR with a reference voltage VREF2 of the reference voltage source 812, and outputs a comparison result signal CMPF to the oscillation circuit 814. When the comparison result signal CMPF is at a low level, the oscillation circuit 814 oscillates at a given frequency (is enabled) and outputs a clock signal as an output signal CLK. When the comparison result signal CMPF is at a high level, the oscillation circuit 814 stops oscillation (is disabled) and fixes the output signal CLK to the low level.

The reverse flow detection circuit 824 compares a drain voltage and a source voltage of the NMOS transistor 831 and outputs a reverse current detection signal to the control circuit 823 when the drain voltage becomes higher than the source voltage.

The control circuit 823 controls the turning on and off of the PMOS transistor 830 and the NMOS transistor 831 in accordance with each input signals.

The inductor 840 and the capacitor 841 smooth a voltage VSW which is an output from a drain of the PMOS transistor 830.

With this configuration, a negative feedback loop functions, and the switching regulator 800 operates so as to make the voltage VFB equal to the reference voltage VREF1 and generates the output voltage VOUT at the output terminal 842. Although not described in Japanese Patent Application Laid-open No. 2010-68671, the phase compensation circuit 860 is generally connected to the output of the error amplification circuit 811 as illustrated in FIG. 8, thereby suppressing the oscillation of the negative feedback loop.

The switching regulator 800 switches between pulse width modulation (PWM) operation and pulse frequency modulation (PFM) operation as explained below, depending on the magnitude of a current flowing through the load connected to the output terminal 842 (a load current).

When the load current is large, the error voltage VERR rises so as to compensate for a drop of the output voltage VOUT. This means that the error voltage VERR is constantly higher than the reference voltage VREF2, and the oscillation circuit 814 keeps output of a clock signal of a given frequency as the output signal CLK. In synchronization with the rise of the clock signal, the PWM conversion circuit 850 turns the PMOS transistor 830 on and the NMOS transistor 831 off. The PWM conversion circuit 850 at this point determines the pulse width of a signal for controlling the on time of the PMOS transistor 830. The switching regulator 800 thus employs PWM operation for small load current.

When the load current subsequently decreases from the condition described above, the error voltage VERR is still constantly higher than the reference voltage VREF2 immediately after the load current decreases. However, since a drop of the output voltage VOUT caused by the small load current is small, increase of the output voltage VOUT caused by turning on of the PMOS transistor 830 becomes large. The error voltage VERR accordingly drops so as to compensate for the rise of the output voltage VOUT and reaches a voltage lower than the reference voltage VREF2. The PMOS transistor 830 is consequently turned off, which causes the output voltage VOUT to drop.

When the output voltage VOUT drops and the error voltage VERR rises and exceeds the reference voltage VREF2, the oscillation circuit 814 outputs a clock signal as the output signal CLK. In synchronization with the rise of the clock signal, the PWM conversion circuit 850 turns the PMOS transistor 830 on and the NMOS transistor 831 off. The turning on of the PMOS transistor 830 causes the output voltage VOUT to exceed the desired voltage in a short time because the load current at this point is small, with the result that the error voltage VERR drops. Then the PWM conversion circuit 850 turns the PMOS transistor 830 off and the NMOS transistor 831 on. The oscillation circuit 814 fixes the output signal CLK to the low level. The oscillation circuit 814 thus repeats oscillation and cessation, in other words, the switching regulator 800 employs PFM operation for small load current.

As described above, the switching regulator 800 of the related art employs a method involving switching between the PWM operation and the PFM operation depending on the result of comparison of the error voltage VERR with the reference voltage VREF2 so that power conversion efficiency can be improved by shifting to the PFM operation when the load current is small.

However, in the switching regulator 800 of the related art as the one described above, switching operation of the PMOS transistor 830 occurs a plurality of times in succession during the PFM operation, which increases a ripple voltage of the output voltage VOUT.

The cause of this problem is that the capacitor 861 and the resistor 862 which are constituents of the phase compensation circuit 860 slow down the change of the error voltage VERR which is an output signal of the error amplification circuit 811 so that the timing at which the oscillation circuit 814 is disabled delays, thereby causing the oscillation circuit 814 to output a clock signal a plurality of times.

The cause is described in detail below with reference to FIG. 9.

FIG. 9 is a diagram for illustrating the waveforms of an inductor current IL which flows in the inductor 840, the output voltage VOUT, the voltage VFB, the error voltage VERR, the comparison result signal CMPF, and the output signal CLK of the oscillation circuit 814 of the switching regulator 800 of the related art.

At time t0, the comparison result signal CMPF is at high level, and the PMOS transistor 830 ceases the switching operation. The voltage VFB drops as the output voltage VOUT drops. When the voltage VFB becomes lower than the reference voltage VREF1, the error voltage VERR starts rising. At time t1, the error voltage VERR exceeds the reference voltage VREF2 and the comparison result signal CMPF switches to a low level which causes output of a clock signal as the output signal CLK, the PMOS transistor 830 turns on, and the inductor current IL flows. This causes the output voltage VOUT to rise. At time t2, the output voltage VOUT exceeds a desired voltage value VTG, that is, the voltage VFB exceeds the reference voltage VREF1, and the error voltage VERR then starts dropping. At a time t3, the error voltage VERR drops lower than the reference voltage VREF2 which causes the switching of the comparison result signal CMPF to the high level.

Since the phase compensation circuit 860 is connected to the output of the error amplification circuit 811 as described above, the error voltage VERR accordingly takes a waveform obtained by integrating the output current from the error amplification circuit 811 with respect to the capacitance of the capacitor 861, which yields a dull signal slowly decreasing since time t2. This takes relatively long a period Pb from time t2 at which the error voltage VERR starts dropping (i.e., from the time when the direction of the change of the error voltage VERR switches) to the time t3 at which the error voltage VERR becomes lower than the reference voltage VREF2 (i.e., the time when the error voltage VERR crosses the reference voltage VREF2). As a result, excess clock signals are output as the output signals CLK from the time t2 to the time t3, thereby causing excess switching operation of the PMOS transistor 830, which gives a high ripple voltage to the output voltage VOUT.

SUMMARY OF THE INVENTION

An object of the present invention is to provide a switching regulator capable of reducing a ripple voltage of an output voltage in PFM operation.

In one aspect of the present invention there is provided a switching regulator including: an inductor connected to the output terminal at one end; a switching element connected between the first power supply terminal and the other end of the inductor; an error amplification circuit configured to output a first error voltage based on the predetermined output voltage and a first reference voltage; a PFM comparison circuit configured to compare the first error voltage with a second reference voltage to output a comparison result signal; an oscillation circuit configured to output a clock signal and to stop output of the clock signal depending on the comparison result signal; a frequency characteristics separation circuit to which the first error voltage is provided, and from which a second error voltage is supplied; a phase compensation circuit connected to the output node of the frequency characteristics separation circuit; and a PWM conversion circuit configured to turn the switching element on and off at a predetermined pulse width, based on the second error voltage and on the output from the oscillation circuit.

According to one aspect of the switching regulator of the present invention, the phase compensation circuit is connected to the output node of the frequency characteristics separation circuit, and thus the second error voltage has a waveform of a slowly changing (dull) signal. The first error voltage, on the other hand, has a waveform of a rapidly changing signal because the frequency characteristics separation circuit separates the frequency characteristics of the first error voltage from the frequency characteristics of the second error voltage, and consequently prevents the phase compensation circuit from affecting the first error voltage. A period from the time when the direction of the change of the first error voltage switches to the time when the first error voltage intersects with the second error voltage can therefore be reduced. The short period reduces excess switching operation of the switching element in PFM operation, which gives a low ripple voltage to the output voltage.

DETAILED DESCRIPTION OF THE PREFERRED EMBODIMENTS

Now, embodiments of the present invention are described with reference to the drawings.

Figure 1:
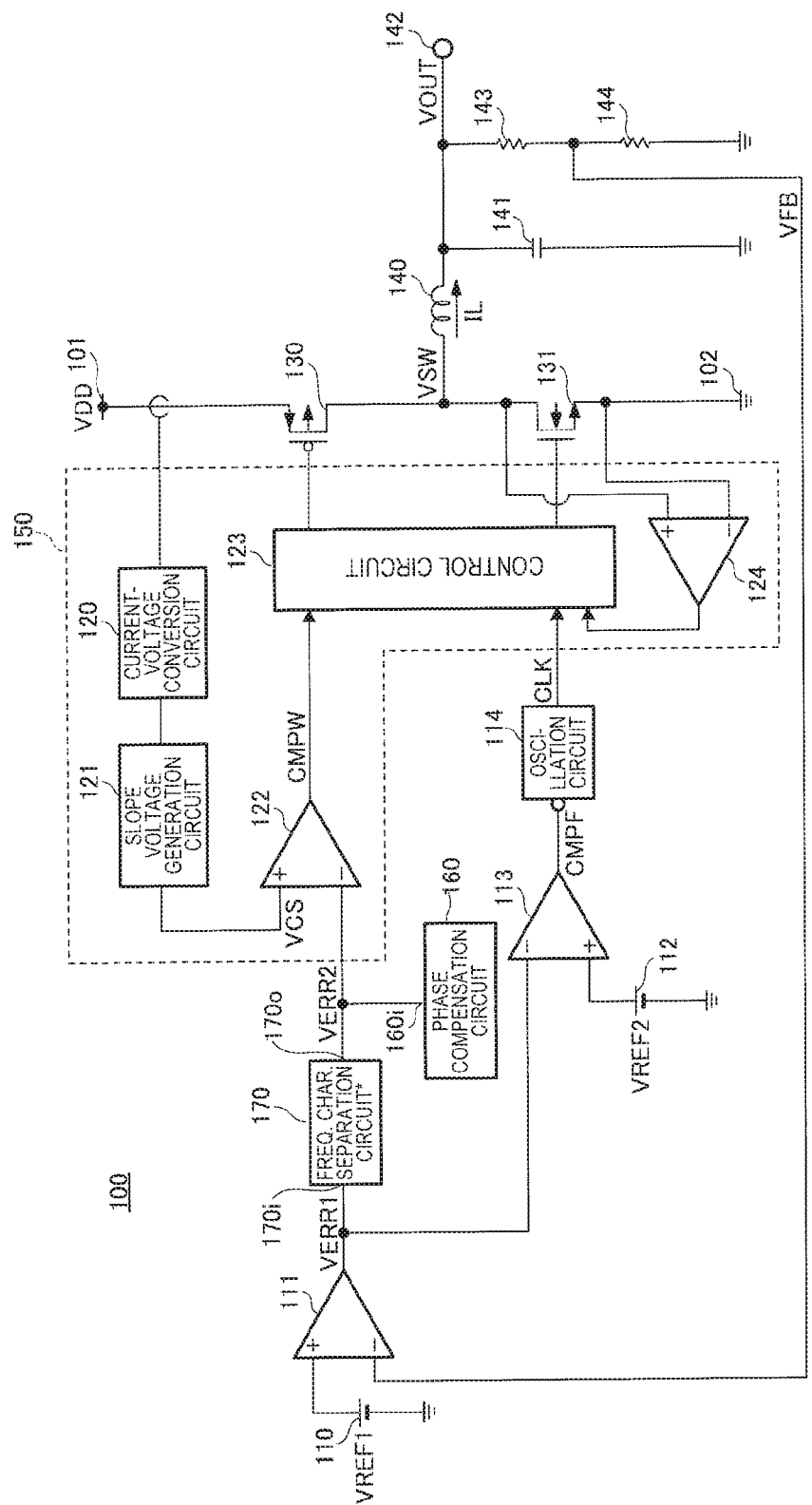
FIG. 1 is a circuit diagram for illustrating a switching regulator according to an embodiment of the present invention.

FIG. 1 is a circuit diagram for illustrating a switching regulator 100 according to the first embodiment of the present invention.

The switching regulator 100 according to the first embodiment includes a power supply terminal 101 (also referred to as "first power supply terminal"), a ground terminal 102 (also referred to as "second power supply terminal"), a reference voltage source 110, an error amplification circuit 111, a reference voltage source 112, a PFM comparison circuit 113, an oscillation circuit 114, a PMOS transistor 130 (also referred to as "switching element"), an NMOS transistor 131 (also referred to as "synchronous rectification element"), an inductor 140, a capacitor 141, resistors 143 and 144, an output terminal 142, a PWM conversion circuit 150, which includes a current-voltage conversion circuit 120, a slope voltage generation circuit 121, a PWM comparison circuit 122, a control circuit 123, and a reverse flow detection circuit 124, a phase compensation circuit 160, and a frequency characteristics separation circuit 170.

The reference voltage source 110 is connected to a non-inverting input terminal of the error amplification circuit 111 at one end and is connected to the ground terminal 102 at the other end. In the error amplification circuit 111, an inverting input terminal is connected to a connection node of the resistor 143 and the resistor 144, and an output is connected to an input node 170$i$ of the frequency characteristics separation circuit 170 and to an inverting input terminal of the PFM comparison circuit 113. An output node 170$o$ of the frequency characteristics separation circuit 170 is connected to an input node 160$i$ of the phase compensation circuit 160 and to an inverting input terminal of the PWM comparison circuit 122. The reference voltage source 112 is connected to a non-inverting input terminal of the PFM comparison circuit 113 at one end and is connected to the ground terminal 102 at the other end. An output of the PFM comparison circuit 113 is connected to an input of the oscillation circuit 114. An output of the oscillation circuit 114 is connected to the input of the control circuit 123.

In the slope voltage generation circuit 121, an input is connected to an output of the current-voltage conversion circuit 120, and an output is connected to a non-inverting input terminal of the PWM comparison circuit 122. An output of the PWM comparison circuit 122 is connected to the input of the control circuit 123. In the PMOS transistor 130, a source is connected to the power supply terminal 101 and an input of the current-voltage conversion circuit 120, a gate is connected to the output of the control circuit 123, and a drain is connected to one end of the inductor 140, a non-inverting input terminal of the reverse flow detection circuit 124, and a drain of the NMOS transistor 131. In the NMOS transistor 131, a gate is connected to the output of the control circuit 123 and a source is connected to the ground terminal 102. In the reverse flow detection circuit 124, an inverting input terminal is connected to the ground terminal 102, and an output is connected to the input of the control circuit 123.

The other end of the inductor 140 is connected to one end of the capacitor 141, one end of the resistor 143, and the output terminal 142. The other end of the capacitor 141 is connected to the ground terminal 102. The other end of the resistor 144 is connected to the ground terminal 102.

Figure 3:
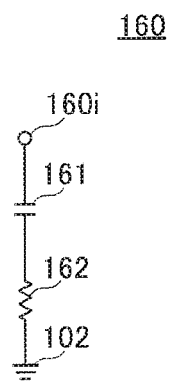
FIG. 3 is a circuit diagram for illustrating a specific example of a phase compensation circuit in the switching regulator of FIG. 1.

The phase compensation circuit 160 includes, for example, a capacitor 161 and a resistor 162, which are connected in series between the input node 160$i$ and the ground terminal 102 as illustrated in FIG. 3.

The operation of the thus configured switching regulator 100 is described below.

The error amplification circuit 111 compares a voltage VFB which is obtained by dividing an output voltage VOUT of the output terminal 142 between the resistor 143 and the resistor 144 with a reference voltage VREF1 of the reference voltage source 110, and outputs an error voltage VERR1.

The voltage VERR1 is supplied to the input node 170$i$ of the frequency characteristics separation circuit 170. An error voltage VERR2 is provided from the output node 170$o$ of the frequency characteristics separation circuit 170, and is separated from the error voltage VERR1 by the frequency characteristics separation circuit 170. The phase compensation circuit 160 is connected to the output node 170$o$ as described above in order to suppress the oscillation of a negative feedback loop of the switching regulator 100. By the presence of the phase compensation circuit 160 the error voltage VERR2 has a waveform of a dull signal (a slowly changing signal).

The current-voltage conversion circuit 120 converts a source current of the PMOS transistor 130 into a voltage, and outputs the voltage to the slope voltage generation circuit 121. The slope voltage generation circuit 121 adds a saw-tooth wave to the output from the current-voltage conversion circuit 120, and outputs a voltage VCS. The PWM comparison circuit 122 compares the error voltage VERR2 with the voltage VCS to output a comparison result signal CMPW to the control circuit 123.

The PFM comparison circuit 113 compares the error voltage VERR1 with a reference voltage VREF2 of the reference voltage source 112, and outputs a comparison result signal CMPF to the oscillation circuit 114. Because the frequency characteristics of the error voltage VERR1 are separated from the frequency characteristics of the error voltage VERR2 by the frequency characteristics separation circuit 170, the error voltage VERR1 is not affected by the phase compensation circuit 160 and accordingly produces a signal that changes more rapidly than the signal produced by the error voltage VERR2.

When the comparison result signal CMPF is at low level, the oscillation circuit 114 oscillates at a given frequency (is enabled) and outputs a clock signal as an output signal CLK. When the comparison result signal CMPF is at high level, the oscillation circuit 114 stops oscillation (is disabled), and fixes the output signal CLK to low level.

The reverse flow detection circuit 124 compares a drain voltage and a source voltage of the NMOS transistor 131 and outputs a reverse current detection signal to the control circuit 123 when the drain voltage is higher than the source voltage.

The control circuit 123 controls the turning on and off of the PMOS transistor 130 and the NMOS transistor 131 in accordance with input signals.

The inductor 140 and the capacitor 141 smooth a voltage VSW which is supplied from the drain of the PMOS transistor 130.

With this circuit configuration, a negative feedback loop functions, and the switching regulator 100 operates so as to make the voltage VFB equal to the reference voltage VREF1 and generates the output voltage VOUT at the output terminal 142.

The switching regulator 100 switches between pulse width modulation (PWM) operation and pulse frequency modulation (PFM) operation as explained below, depending on the magnitude of a current flowing through a load (not shown) connected to the output terminal 142 (a load current).

When the load current is large, the error voltage VERR1 rises so as to compensate for a drop of the output voltage VOUT. This means that the error voltage VERR1 is constantly higher than the reference voltage VREF2, and the oscillation circuit 114 keeps output of a clock signal of a given frequency as the output signal CLK. In synchronization with the rise of the clock signal, the PWM conversion circuit 150 turns the PMOS transistor 130 on and the NMOS transistor 131 off. The PWM conversion circuit 150 at this point determines the pulse width of a signal for controlling the on time of the PMOS transistor 130. The switching regulator 100 thus employs PWM operation for small load current.

When the load current subsequently decreases from the condition described above, the error voltage VERR1 is still constantly higher than the reference voltage VREF2 immediately after the load current decreases. However, since a drop of the output voltage VOUT caused by the small load current is small, increase of the output voltage VOUT caused by turning on of the PMOS transistor 130 becomes large. The error voltage VERR1 accordingly drops so as to compensate for the rise of the output voltage VOUT and reaches a voltage lower than the reference voltage VREF2. The PMOS transistor 130 is consequently turned off, which causes the output voltage VOUT to drop.

When the output voltage VOUT drops and the error voltage VERR1 rises and exceeds the reference voltage VREF2, the oscillation circuit 114 outputs a clock signal as the output signal CLK. In synchronization with the rise of the clock signal, the PWM conversion circuit 150 turns the PMOS transistor 130 on and the NMOS transistor 131 off. The turning on of the PMOS transistor 130 causes the output voltage VOUT to exceed the desired voltage in a short time because the load current at this point is small, with the result that the error voltage VERR1 and the error voltage VERR2 drop. Then the PWM conversion circuit 150 turns the PMOS transistor 130 off and the NMOS transistor 131 on. The oscillation circuit 114 fixes the output signal CLK to the low level. The oscillation circuit 114 thus repeats oscillation and cessation, in other words, the switching regulator 100 employs PFM operation for small load current.

In this manner, the switching regulator 100 according to the first embodiment can improve power conversion efficiency by shifting to the PFM operation for small load current.

The circuit operation of the switching regulator 100 in PFM operation is described in detail below in order to describe the characteristic configuration of the switching regulator 100 according to the first embodiment.

Figure 2:
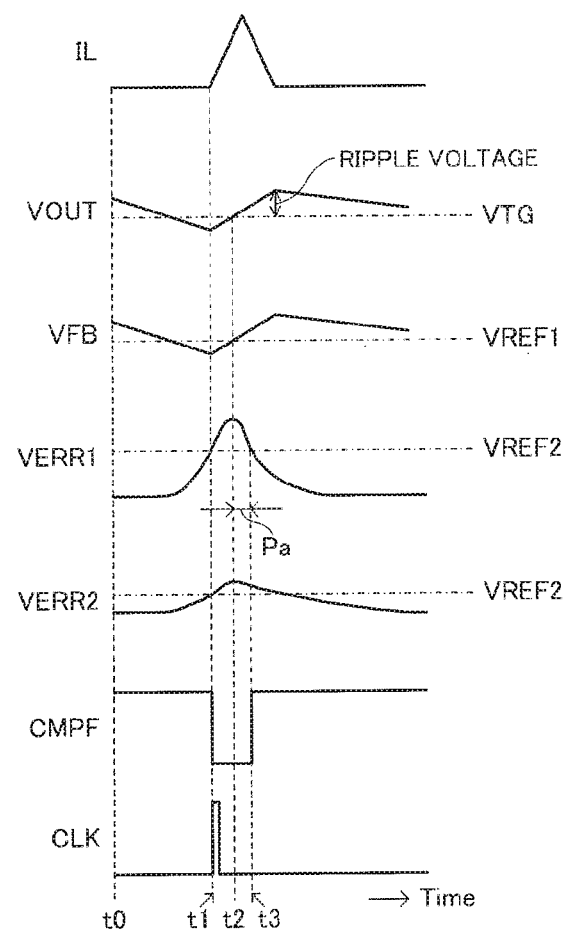
FIG. 2 is a diagram for illustrating the signal waveforms of nodes in the switching regulator of FIG. 1.

FIG. 2 is a diagram for illustrating waveforms of the inductor current IL, the output voltage VOUT, the voltage VFB, the error voltage VERR1, the error voltage VERR2, the comparison result signal CMPF, and the output signal CLK of the oscillation circuit 114 in the switching regulator 100 according to the first embodiment.

At time t0, the comparison result signal CMPF is at high level, and the PMOS transistor 130 ceases the switching operation and is turned off. The output voltage VOUT drops because the PMOS transistor 130 is turned off, and the voltage VFB accordingly drops as well. When the voltage VFB becomes lower than the reference voltage VREF1, the error voltage VERR1 and the error voltage VERR2 start rising. As described above, the error voltage VERR1 and the error voltage VERR2 differ from each other in frequency characteristics due to the frequency characteristics separation circuit 170, and the error voltage VERR1 accordingly rises rapidly whereas the error voltage VERR2 rises slowly.

At time t1, the error voltage VERR1 exceeds the reference voltage VREF2, which triggers an inversion of the comparison result signal CMPF to low level, and the oscillation circuit 114 accordingly outputs a clock signal as the output signal CLK. The clock signal is received by the control circuit 123 which then turns the PMOS transistor 130 on, thereby causing the inductor current IL to flow and the output voltage VOUT and the voltage VFB to rise.

At time t2, the output voltage VOUT exceeds a desired voltage VTG, that is, the voltage VFB exceeds the reference voltage VREF1, which starts a drop of the error voltage VERR1 and the error voltage VERR2. At this time, too, the error voltage VERR1 drops rapidly whereas the error voltage VERR2 drops slowly, due to the difference in frequency characteristics between the error voltage VERR1 and the error voltage VERR2.

At time t3, the error voltage VERR1 drops lower than the reference voltage VREF2. The drop to a voltage lower than VREF2 is detected by the PFM comparison circuit 113, and inverts the comparison result signal CMPF to high level.

According to the first embodiment, since the error voltage VERR1 can have a waveform of a rapidly changing signal is produced, a period Pa from the time t2 at which the error voltage VERR1 starts dropping to the time t3 at which the error voltage VERR1 becomes lower than the reference voltage VREF2 can thus be made short. An unnecessary output of a clock signal as the output signal CLK after the output of a clock signal at the time t1 as the output signal CLK from the oscillation circuit 114 can be prevented as a result. Absence of unnecessary switching operation of the PMOS transistor 130 can suppress increase of the ripple voltage of the output voltage VOUT.

Since the error voltage VERR2 provided to the inverting input terminal of the PWM comparison circuit 122, on the other hand, has a waveform of a slowly changing signal due to the phase compensation circuit 160, the oscillation of the negative feedback loop of the switching regulator 100 can be suppressed as well.

The first specific example to fourth specific example of the frequency characteristics separation circuit 170 in the switching regulator 100 according to the first embodiment are described below with reference to FIGS. 4 to 7.

Figure 4:
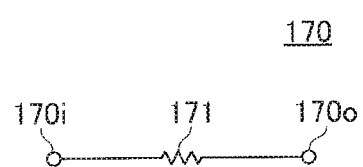
FIG. 4 is a circuit diagram for illustrating a first specific example of a frequency characteristics separation circuit in the switching regulator of FIG. 1.

The first specific example of the frequency characteristics separation circuit 170 is illustrated in FIG. 4. The frequency characteristics separation circuit 170 of the first specific example includes a resistor 171 which is connected at one end to the input node 170*i* and is connected at the other end to the output node 170*o*.

Figure 5:
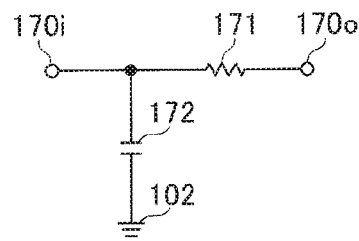
FIG. 5 is a circuit diagram for illustrating a second specific example of the frequency characteristics separation circuit in the switching regulator of FIG. 1.

The second specific example of the frequency characteristics separation circuit 170 is illustrated in FIG. 5. The frequency characteristics separation circuit 170 of the second specific example has a configuration in which a capacitor 172 is added to the first specific example illustrated in FIG. 4. The capacitor 172 is connected between the one end of the resistor 171 (the input node 170*i*) and the ground terminal 102. With the addition of the capacitor 172, the response speed of the error voltage VERR1 can be adjusted.

Figure 6:
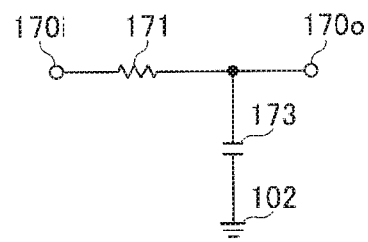
FIG. 6 is a circuit diagram for illustrating a third specific example of the frequency characteristics separation circuit in the switching regulator of FIG. 1.

The third specific example of the frequency characteristics separation circuit 170 is illustrated in FIG. 6. The frequency characteristics separation circuit 170 of the third specific example has a configuration in which a capacitor 173 is added to the first specific example illustrated in FIG. 4. The capacitor 173 is connected between the other end of the resistor 171 (the output node 170*o*) and the ground terminal 102. With the addition of the capacitor 173, the response speed of the error voltage VERR2 can be adjusted.

Figure 7:
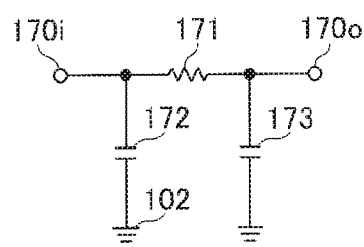
FIG. 7 is a circuit diagram for illustrating a fourth specific example of the frequency characteristics separation circuit in the switching regulator of FIG. 1.
Figure 8:
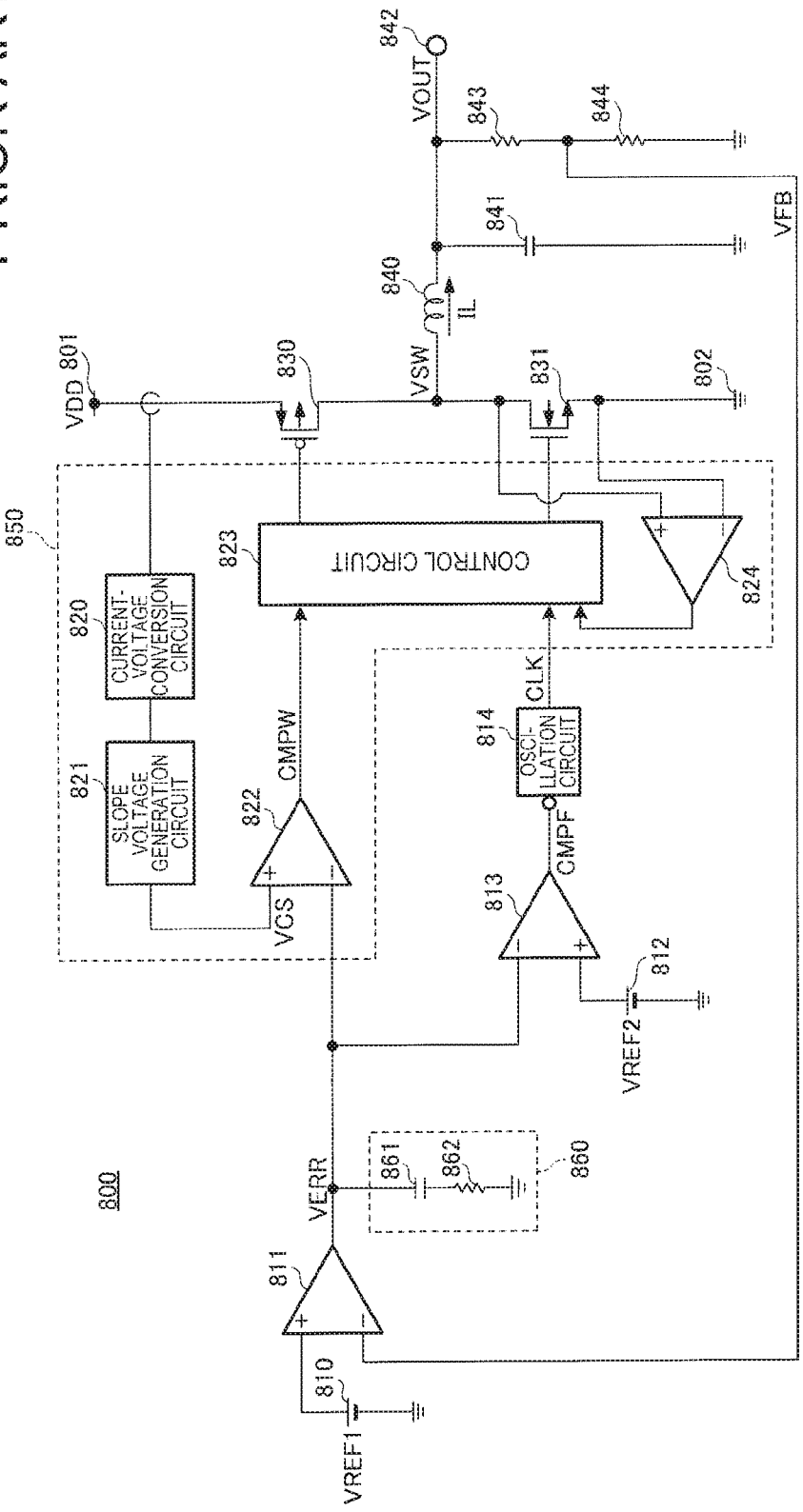
FIG. 8 is a circuit diagram for illustrating a switching regulator of the related art.
Figure 9:
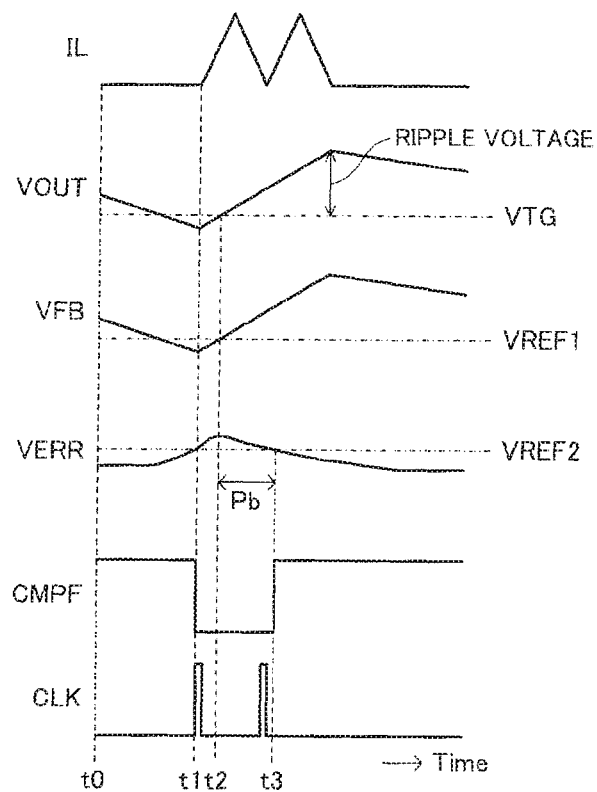
FIG. 9 is a diagram for illustrating the signal waveforms of nodes in the switching regulator of FIG. 8.

The fourth specific example of the frequency characteristics separation circuit 170 is illustrated in FIG. 7. The frequency characteristics separation circuit 170 of the fourth specific example has a configuration in which the capacitor 172 and the capacitator 173 are added to the first specific example illustrated in FIG. 4. The capacitor 172 is connected between the one end of the resistor 171 (the input node 170*i*) and the ground terminal 102. The capacitor 173 is connected between the other end of the resistor 171 (the output node 170*o*) and the ground terminal 102. With the addition of the capacitors 172 and 173, the response speed of each of the error voltage VERR1 and the error voltage VERR2 can be adjusted.

The embodiments of the present invention have been described above, but the present invention is not limited to the above-mentioned embodiments, and it is to be understood that various modifications can be made thereto without departing from the gist of the present invention.

For instance, while the descriptions of the embodiments given above take a current mode control-type switching regulator as an example, the present invention is applicable also to a voltage mode control-type switching regulator.

The descriptions of the embodiments given above take as an example a case of using MOS transistors as a switching element and a synchronous rectification element. However, bipolar transistors or the like may be used instead of MOS transistors.

The embodiments given above take a switching regulator for synchronous rectification as an example. However, the present invention is applicable also to a switching regulator for diode rectification. The reverse flow detection circuit is not required in the diode rectification.

What is claimed is:

1. A switching regulator which generates a predetermined output voltage at an output terminal from a power supply voltage supplied to a first power supply terminal, the switching regulator comprising: an inductor connected to the output terminal at a first end of the inductor; a switching element connected between the first power supply terminal and a second end of the inductor; an error amplification circuit configured to amplify a difference between a voltage based on the predetermined output voltage and a first reference voltage to output a first error voltage; a frequency characteristics separation circuit having an input node to which the first error voltage is provided, and an output node from which a second error voltage is supplied; a phase compensation circuit having a first end connected to the output node of the frequency characteristics separation circuit and a second end connected to a second power supply terminal, the phase compensation circuit comprising a resistor and a capacitor connected in series; wherein the second error voltage is filtered by the frequency characteristics separation circuit and is compensated by the phase compensation circuit, and wherein the first error voltage is unfiltered with respect to the frequency characteristics separation circuit and is uncompensated with respect to the phase compensation circuit; a PFM comparison circuit configured to compare the first error voltage with a second reference voltage to output a comparison result signal at one of a first level and a second level; an oscillation circuit configured to output a clock signal of a predetermined frequency when the comparison result signal is at the first level, and to stop output of the clock signal when the comparison result signal is at the second level; and a PWM conversion circuit configured to turn the switching element on and off at a predetermined pulse width, based on the second error voltage and on the output from the oscillation circuit.

2. A The switching regulator according to claim 1, wherein the frequency characteristics separation circuit includes a resistor connected to the input node at a first end of the resistor and connected to the output node at a second end of the resistor.

3. A The switching regulator according to claim 2, wherein the frequency characteristics separation circuit further includes a capacitor connected between the first end of the resistor and the second power supply terminal.

4. A The switching regulator according to claim 2, wherein the frequency characteristics separation circuit further includes a capacitor connected between the second end of the resistor and the second power supply terminal.

5. A The switching regulator according to claim 2, wherein the frequency characteristics separation circuit further includes a first capacitor connected between the first end of the resistor and the second power supply terminal, and a second capacitor connected between the second end of the resistor and the second power supply terminal.

* * * * *